UNITED STATES PATENT OFFICE.

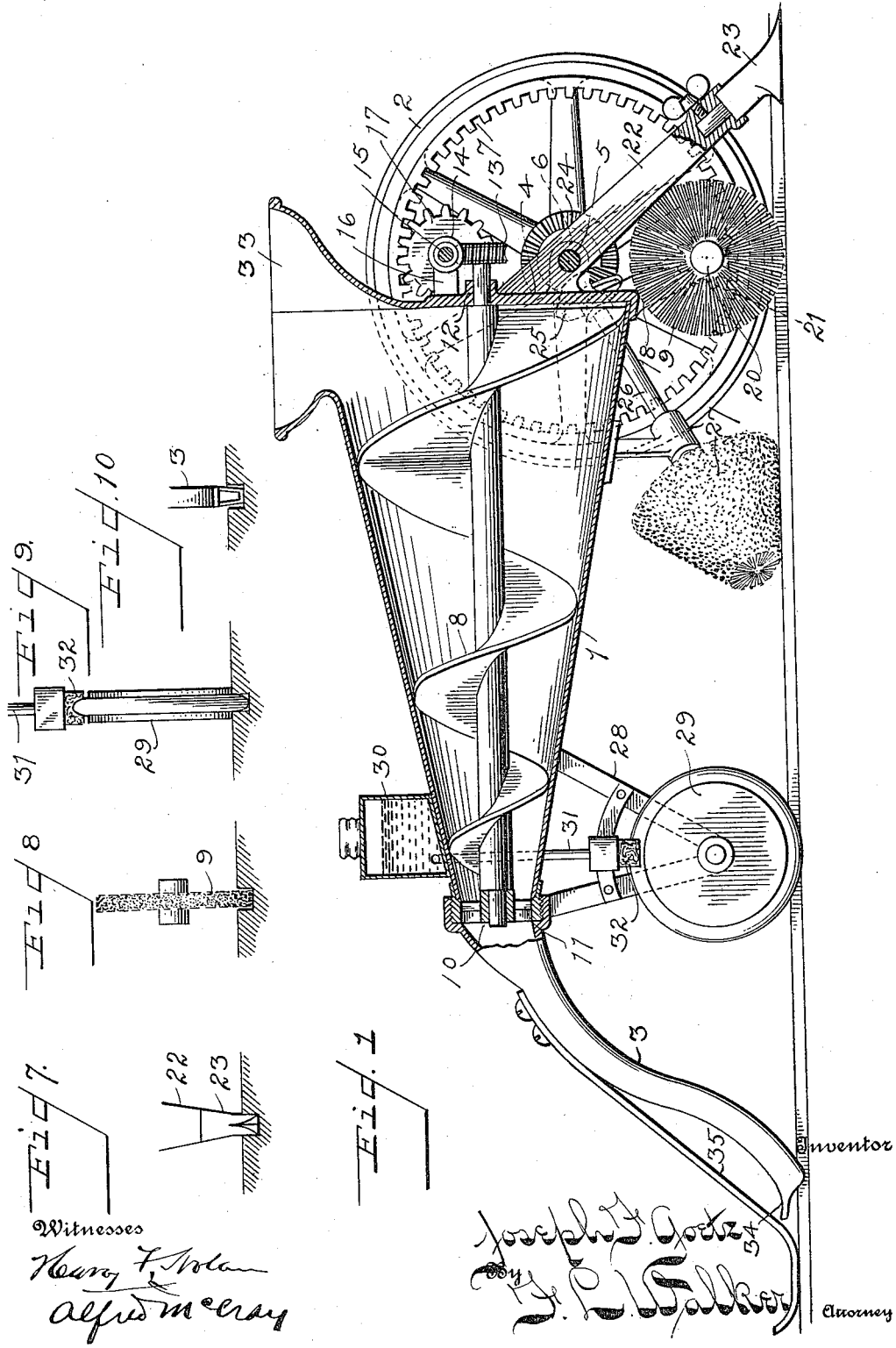

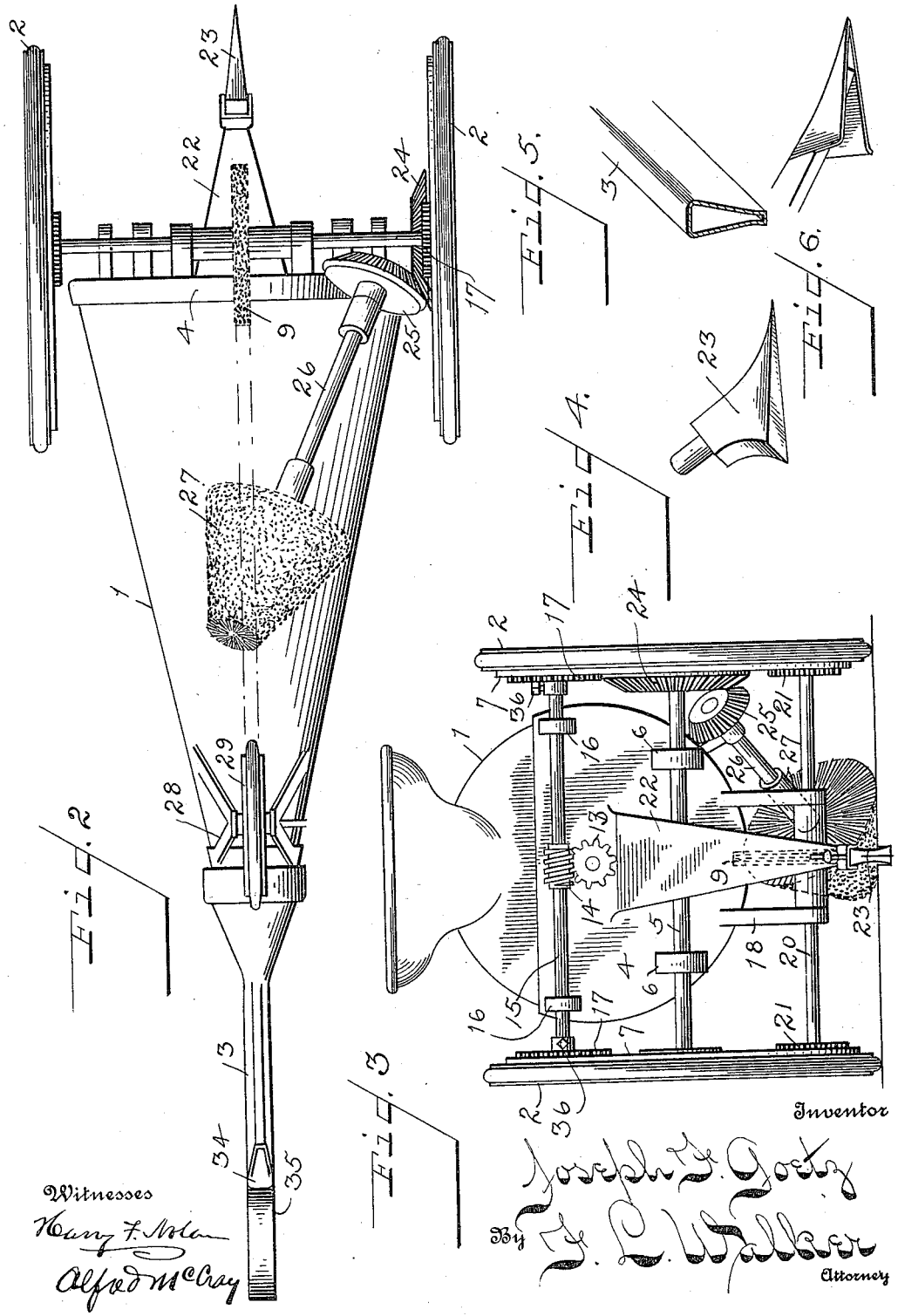

JOSEPH F. GOETZ, OF DAYTON, OHIO.

CRACK-FILLING MACHINE.

1,154,305.  Specification of Letters Patent.  Patented Sept. 21, 1915.

Application filed March 16, 1914. Serial No. 825,149.

*To all whom it may concern:*

Be it known that I, JOSEPH F. GOETZ, citizen of the United States, residing at Dayton, in the county of Montgomery and State of Ohio, have invented certain new and useful Improvements in Crack-Filling Machines, of which the following is a specification.

My invention relates to painting and decorating art and particularly to a crack filler for cleaning and filling the cracks of floors or other structures and filling them with cement, putty or similar plastic material preparatory to staining, painting, or applying surface dressing thereto.

The object of the invention is to simplify the structure as well as the means and mode of operation of such devices whereby they will not only be cheapened in construction but will be more efficient in use, easily and rapidly operated, substantially automatic in action and unlikely to get out of repair.

In resurfacing old floors, it is usually found that the cracks between succeeding boards have been filled with accumulations of dirt and foreign matter, which it is desirable to remove and thereafter to fill such cracks uniformly with a plastic material which will harden and present a surface continuous with the adjacent boards. Heretofore it has been the custom to remove such accumulations of dirt by the use of an awl, a knife or any other pointed or edged hand tool which may be employed as a gouge. Such cracks are subsequently filled with plastic material by the use of a painter's putty knife or some similar tool. The several operations of digging or gouging the accumulation of dirt out of the cracks, brushing and sweeping the loose particles aside, moistening or oiling the crack preparatory to receiving the plastic material and subsequently filling the plastic material thereinto have each been performed separately and by hand operations. By such method it is practically impossible to fill the cracks uniformly throughout.

The primary object of the present invention is to provide means for simultaneously removing the accumulation of dirt, sweeping the open seam or crack to remove the loose particles, applying oil or other liquid thereto in an economical manner which will not distribute the oil or liquid over the adjacent floor boards supplying a uniform quantity of plastic material throughout the length of the crack and pressing the material uniformly into position.

With the above primary and other incidental objects in view as will more fully appear in the specification, the invention consists of the features of construction, the parts and combinations thereof and the mode of operation or their equivalent as herein after described and set forth in the claims.

In the drawings Figure 1 is a longitudinal sectional view of the assembled machine. Fig. 2 is a bottom plan view thereof. Fig. 3 is a front elevation of the assembled machine. Figs. 4, 5 and 6 are detail views of the gouge or plow, by which the accumulations are removed and the conduit by which the plastic material is supplied to the crack. Figs. 7, 8, 9 and 10 are detail views of the operative parts, showing their relation with the crack operated upon.

Like parts are indicated by similar characters of reference throughout the several views.

The machine forming the subject matter hereof, is a hand tool adapted to be pushed forward with a continuous movement, while the bit or share of the gouge or plow engages in the crack in advance of the machine and the supply conduit engaging in the crack at the rear of the machine. The body of the machine as hereinafter described is of such shape and proportions as to be conveniently grasped in the hand of the operator to form a handle for actuating the machine throughout operative movement.

Referring to the drawings, 1 is a conical reservoir or container for plastic material such as cement, putty, thick paint, wax or other similar material. The container or reservoir 1 is supported at its forward end upon two carrying wheels 2 and at its rearward end upon a dependent filler supply conduit 3 hereinafter described. At the forward end of the reservoir or container 1 is a frame or supporting member 4 carrying bearing brackets and bearings for the various operating parts. The carrying wheels 2 are mounted upon a transverse axle 5 supported in bearings 6 projecting from the frame member 4. Either one or both of the carrying wheels 2 are provided with internal spur gears 7, by which is operated a spiral conveyer or feed screw 8 within the reservoir or container 1 and a rotary sweeper or brush 9. The spiral conveyer 8 is mounted in a bearing 10 supported centrally at the smaller end of the conical reservoir upon radial arms 11 and at its opposite end the screw is mounted in a bearing 12 in the frame member 4. At its forward end the shaft of the feed screw 8 carries a worm wheel 13 engaged by a worm 14 upon a transverse shaft 15 mounted in bearings 16 projecting from the member 4. The transverse shaft 15 carries at its extremity a gear pinion 17 meshing with the internal gear 7 of the carrying wheel 2. In the event that both carrying wheels are provided with internal gears 7, the shaft 15 will likewise be provided with two gear pinions 17 to mesh with the respective gears 7.

Supported in bracket arms 18 projecting from the lower portion of the member 4, is a rotary sweeper or brush 9 projecting within the crack in the path of the gouge or plow and adapted to expel therefrom the loose particles of foreign material. There is carried upon the extremity of the shaft 20 of the sweeper 9, a gear pinion 21, which also meshes with the internal gear 7 of the wheel 2. Thus the rotation of the carrying wheel 2 serves to rotate the gear pinion to actuate the filler feeding screw 8 and simultaneously rotates the gear pinion 21 to operate the rotary sweeper 9. Projecting downwardly and forwardly from the supporting member 4 and extending in advance of the sweeper 9 is a gouge or prod arm 22, carrying at its extremity a detachable bit or share 23 projecting within the crack operated upon. The operating portion of this share or bit is preferably pointed and triangular in cross section. It is obvious however that the bit or share may be of any convenient shape found suitable for the width and depth of the crack operated upon and the nature of the accumulation to be removed. The bit or share is made detachable to facilitate the replacement thereof when worn or broken and to enable different sizes of shares or bits to be employed in proportion to the width and depth of the crack. One of the carrying wheels is provided with a beveled pinion 24 with which meshes a second pinion 25 carried upon the extremity of a revoluble shaft 26 extending downwardly, rearwardly and obliquely in relation with the path of travel of the machine. The shaft 26 is supported in bearings carried upon the reservoir 1 or in any other suitable manner. At its lower rearmost extremity the shaft 26 carries a revoluble sweeper or brush 27, which operates to remove the debris loosened by the gouge or prod bit 23, and the rotary sweeper 9 from the vicinity of the crack. It is to be noted that the rotary sweeper 9 operates in a plane coincident with the crack operated upon, while the sweeper 27 rotates in a plane angular in relation with the crack and the path of the machine. Adjacent to the rear of the reservoir 1 there is pivotally supported in suitable brackets 28, a rotary wheel 29, preferably of leather, felt, fabric or some similar material but which might be of wood or metal. The wheel 29 is a moistening or oiling wheel and projects within the crack. While the wheel 29 may be merely a flat disk, it is preferably a wheel provided with a centrally disposed peripheral flange, which projects within the crack, while the lateral tread portions of the wheel engage the floor board at either side of the crack. This construction causes the peripheral flange to engage the sides and bottom of the crack with a wiping action. The lateral tread portions of the wheel engaging and rotating upon the adjacent floor boards gives to the peripheral flange a peripheral speed greater than the lineal speed of the machine, causing a slipping or rubbing movement between the flange and the sides and bottom of the crack. This insures a uniform distribution of the oil or other fluid.

Mounted upon the rear of the reservoir 1 is an auxiliary reservoir 30 for oil or other moistening fluid from which a conduit 31 leads to a pad 32, which engages the periphery of the liquid applying wheel 29. Thus as the machine is advanced the wheel 29 is rotated to receive upon its periphery a charge of oil or other liquid deposited thereon by the liquid saturated pad 32 and is adapted in turn to deposit said charge or oil or other liquid in the crack operated upon as the wheel rotates. It is to be understood that the crack has been previously cleaned by the action of the plow or gouge 23 supplemented by the rotary brushes 9 and 27. The moistening or oiling of the crack prepares it to receive the filling material, which is deposited therein through the conduit 3. This conduit projects from the rear or smaller extremity of the reservoir 1 and is preferably though not necessarily substantially V shaped in cross section. The filler material, whether wax, putty, cement or other substance is placed in the reservoir 1 through the hopper 33 and is compressed therein and simultaneously forced rearward by the action of the rotary screw conveyer 8. The rotation of the conveyer 8 causes the filler material to be discharged from the rear of the reservoir 1 through the discharge conduit 3 in the form of a ribbon of uniform density throughout, which is deposited edgewise in the crack operated upon. The extremity of the discharge conduit 3 is preferably somewhat beveled as shown in Fig. 1 and is provided with an overhanging lip 34 which gages the height of the ribbon filler material. This ribbon of material which has been compressed to uniform density by the action of the conveyer 8 when deposited in the crack projects somewhat above the level of the adjacent floor boards. To compress the ribbon of material in the crack, there is provided a spring presser arm 35, which trails behind the discharge conduit 3 and bears upon the floor at either side of the crack. This presser arm 35 serves to force the material in the crack, and bevel it flush with the floor.

The discharge conduit 3 is preferably screw threaded or otherwise detachably connected with the reservoir 1, whereby conduits of different sizes may be substituted, for use in cracks of different widths or depth. When in use, the operator grasps the reservoir 1 as a handle and pushes the machine forward with the bit of the prod arm or gouge engaging the crack in advance and the conduit 3 engaging the crack in the rear of the machine, while the rotary brush 9 and the rotary oiling device 29 engage in the crack intermediate the plow or gouge and the conduit. As the machine is advanced, the rotary conveyer 8 is operated to force the filler material rearward through the reservoir and then through the discharge conduit into the crack. It is to be noted that the screw conveyer 8 will discharge material only during the forward movement of the machine. Thus it will be seen that the amount of material discharged will be proportionate to the length of the crack operated upon. It is obvious that for certain classes of work, the oiling or moistening wheel 29 and either one or both of the sweepers 9 and 27 may be omitted, while for new work, the prod or gouge 23 may be dispensed with and only the remaining members employed.

In starting the cleaning of a crack adjacent to a wall, the machine is reversed and operated toward the same for a distance equal to the length of the machine to remove the accumulation of dirt. During this preliminary operation it is not desired to discharge filling material as the portion of the crack beneath the conduit has not been prepared to receive it. To render the conveyer or feeding screw 8 ineffective during each preliminary operation the gear pinions 17 are adjusted laterally upon the shaft 16 to positions out of engagement with the drive gears 7. These pinions may be keyed or splined upon the shaft or may be secured by set screws 36.

At the finish end of the crack the prod arm will engage the wall limiting the advance of the machine while the supply conduit is arrested at a point the length of the machine from the wall. The crack will thus be cleaned entirely to the wall. To fill this remaining portion, the machine is again reversed and operated in a direction away from the wall. In order that the prod will not remove the previously placed filling material during the final operation, the bit or share 23 of the prod arm is removed.

In lieu of interchangeable prods or shares 23 there may be used a share such as is shown in Fig. 6 having either one or both sides yielding or flexible, whereby the share may be compressed into a narrow crack or will automatically expand to engage the opposite sides of a crack of greater width. In such prod or share the rear edges of the flexible or yielding sides may be turned slightly outward to produce a scraping effect upon the sides of the crack. As shown in Fig. 6 the prod arm extends to the bottom of the share making the point of the share solid and non yielding.

From the above description it will be apparent that there is thus provided a device of the character described, possessing the particular features of advantage before enumerated as desirable, but which obviously is susceptible of modification in its form, proportion, detail construction and arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. In a device of the character described, a main frame adapted to be moved over the surface operated upon, and a prod arm carried by the main frame, a pyramidal head positioned with a flat face lowermost on said arm and engaging in a crack in said surface, the main frame gaging the depth of the engagement of the head.

2. In a device of the character described, a main frame adapted to be moved over the surface operated upon, a prod arm carried by the main frame and engaging a crack in the said surface, and a brush also carried by the main frame and operating in the path of the prod arm.

3. In a device of the character described, a main frame adapted to be moved over the surface operated upon, a prod arm carried by the main frame, a compressible pyramidal head carried by the arm and engaging a crack in the said surface.

4. In an apparatus as described, means for expelling the contents of the crack operated upon, means for sweeping the crack, and means for thereafter depositing plastic material in the crack.

5. In a device of the character described, a container for plastic material, a substantially V shaped discharge nozzle therefor adapted to discharge a ribbon like body of material edgewise into the crack operated upon.

6. In a device of the character described, a container for plastic material, a flattened discharge nozzle having its maximum width in a vertical direction leading from the container and adapted to discharge a vertically disposed ribbon of material into the crack operated upon.

7. In a device of the character described, a container of plastic material, a discharge nozzle having a beveled outlet orifice leading therefrom adapted to discharge the material rearwardly into the crack operated upon, the bevel of the nozzle being such as to provide an overhanging lip at the upper side of the outlet orifice of the discharge nozzle.

8. In a device of the character described, a container for plastic material, a discharge nozzle therefor, and means for automatically ejecting the material from the container actuated by the advance movement of the container.

9. In a device of the character described, a container for plastic material, carrying wheels therefor, and ejector means operated by the rotation of the carrying wheels.

10. In a device of the character described, a container for plastic material, a rotary feeding device adapted to discharge the material from the container, and means for rotating the feeding device by the movement of the container.

11. In a device of the character described, a container for plastic material, a discharge conduit therefor adapted to discharge the material into the crack operated upon, and a brush engaging the crack in advance of the discharge conduit.

12. In a device of the character described, a container for plastic material, a discharge conduit therefor adapted to discharge the material into the crack operated upon, and a rotary brush actuated by the movement of the container engaging the crack in advance of the conduit.

13. In a device of the character described, a container for plastic material, carrying wheels therefor, a discharge nozzle for the container, ejecting means for the material actuated by the rotation of the carrying wheels, and a rotary brush engaging in the crack in advance of the discharge nozzle and actuated by the carrying wheels.

14. In a device of the character described, a container for plastic material, a nozzle therefor discharging into the crack operated upon, a reservoir for liquid, and a liquid applying device engaging the crack in advance of said nozzle.

15. In a device of the character described, a container for plastic material, a discharge conduit therefor discharging the material into the crack operated upon, and a liquid applying device engaging the crack in advance of the conduit.

16. In a device of the character described, a prod for removing the accumulation of dirt, means for feeding plastic material into the crack operated upon, and means for supplying liquid to the crack in advance of the plastic material.

17. In a device of the character described, a supply conduit discharging plastic material into the crack operated upon, and a wiping member projecting into the crack in advance of the conduit.

18. In a device of the character described, a supply conduit discharging plastic material into the crack operated upon, a wheel engaging in the crack operated upon in advance of the conduit and means for supplying a liquid to the wheel.

19. In a device of the character described, a supply conduit discharging plastic material into the crack operated upon, a wheel having a peripheral flange engaging the crack in advance of the conduit, and lateral tread portions engaging the surface adjacent to the crack, whereby the crack engaging flange will be given a peripheral speed greater than its lineal speed and means for supplying a liquid to the flange portion of the wheel by which it is in turn applied to the walls of the crack by the wiping action of the flange.

20. In a device of the character described, a supply conduit discharging plastic material into the crack operated upon, a liquid applying wheel engaging in the crack in advance of the conduit, and means for causing the wheel to rotate with a peripheral speed greater than its lineal speed and means for supplying a liquid to the wheel to be applied to the walls of the crack by the wiping action of the wheel.

21. In an apparatus of the character described, means for applying matter to the walls of the crack operated upon comprising a revoluble member traveling in a lineal direction alined with the crack into which the periphery of the member projects, and means for rotating the disk at a peripheral speed greater than its lineal speed, the construction and arrangement being such that the matter supplied to the marginal portions of the disk will be deposited upon the walls of the crack by a wiping action.

22. In an apparatus of the character described, means for applying matter to the walls of the crack operated upon, comprising a traveling wiping member engaging in the crack and movable in alinement therewith and means for giving to the wiping member a wiping movement of greater speed than its lineal speed, and means for supplying matter to the wiping member to be deposited on the wall of the crack by its wiping action.

23. In a device of the character described, a container for plastic material, a discharge nozzle therefor, and means actuated by the movement of the device for automatically ejecting the material in quantities proportionate to the length of the crack traversed.

24. In an apparatus of the character described, a container for plastic material, means for ejecting the material therefrom, means for molding the ejected material into a ribbon like form and depositing the ribbon of material edgewise within the crack operated upon.

25. In a device of the character described, means for depositing plastic material in the crack operated upon, and two brushes operating in transverse directions engaging the crack in advance of the deposits of plastic material.

In testimony whereof, I have hereunto set my hand this 13th day of March, 1913.

JOSEPH F. GOETZ.

Witnesses:
 HARRY F. NOLAN,
 EFFIE B. SHOME.

Copies of this patent may be obtained for five cents each, by addressing the "Commissioner of Patents. Washington, D. C."